(12) United States Patent
Rajek et al.

(10) Patent No.: US 11,971,000 B2
(45) Date of Patent: Apr. 30, 2024

(54) ELECTRIC STARTER SYSTEM FOR MOTORCYCLES

(71) Applicant: W & W Cycles AG, Würzburg (DE)

(72) Inventors: Josef Rajek, Fritzens (AT); Peter Unterberger, Fritzens (AT)

(73) Assignee: W & W Cycles AG (DE)

(*) Notice: Subject to any disclaimer, the term of this patent is extended or adjusted under 35 U.S.C. 154(b) by 112 days.

(21) Appl. No.: 17/610,324

(22) PCT Filed: May 21, 2019

(86) PCT No.: PCT/EP2019/063121
§ 371 (c)(1),
(2) Date: Jul. 5, 2022

(87) PCT Pub. No.: WO2020/233800
PCT Pub. Date: Nov. 26, 2020

(65) Prior Publication Data
US 2022/0325686 A1    Oct. 13, 2022

(51) Int. Cl.
| | |
|---|---|
| *F02N 11/08* | (2006.01) |
| *B62K 23/08* | (2006.01) |
| *F02N 3/04* | (2006.01) |
| *F02N 15/02* | (2006.01) |
| *F02N 15/06* | (2006.01) |

(52) U.S. Cl.
CPC .......... *F02N 11/0851* (2013.01); *B62K 23/08* (2013.01); *F02N 3/04* (2013.01); *F02N 15/022* (2013.01); *F02N 15/068* (2013.01)

(58) Field of Classification Search
CPC ........... F02N 3/04; F02N 11/00; F02N 15/023
USPC ....................................... 123/179.24, 179.25
See application file for complete search history.

(56) References Cited

U.S. PATENT DOCUMENTS

| | | | |
|---|---|---|---|
| 6,109,121 A | 8/2000 | Brown | |
| 6,732,694 B2* | 5/2004 | Holweg | F02B 75/22 |
| | | | 123/192.2 |
| 6,895,915 B2* | 5/2005 | Hemphill | F02N 15/023 |
| | | | 29/888.011 |

(Continued)

FOREIGN PATENT DOCUMENTS

DE    202016104454 U1    12/2016

*Primary Examiner* — Phutthiwat Wongwian
*Assistant Examiner* — Arnold Castro
(74) *Attorney, Agent, or Firm* — Frank H. Foster; Kremblas & Foster

(57) ABSTRACT

An electric starter system (100) for a motorcycle with a mechanical kick-start device (200) and a transmission main shaft (340) which rotates in a starting and drive rotational direction (x) and the kick-start device (200) has a kick-start pinion configured for axial coupling to a kick-start clutch part (240) which is connected to the transmission main shaft (340) in a torque-transmitting manner. The electric starter system (100) comprises an electric starter motor (110) with a starter shaft pinion (112) that can be driven thereby, which makes it possible to carry out the installation or retrofitting thereof with fewer modifications of the original components, less expenditure of time, and/or easier, and/or faster. This is achieved because a torque of the electric starter motor (110) can be transmitted from the starter shaft pinion (112), preferably at the end face, to the kick-start clutch part (240), in particular via interposed starter gearing (120).

15 Claims, 6 Drawing Sheets

(56) References Cited

U.S. PATENT DOCUMENTS

| | | |
|---|---|---|
| 7,140,339 B1 | 11/2006 | Smith |
| 10,677,213 B2 * | 6/2020 | van der Kwaak ...... F02N 11/00 |
| 2007/0017466 A1 * | 1/2007 | Leppanen ............. F02N 15/006 |
| | | 123/179.25 |
| 2018/0045161 A1 * | 2/2018 | van der Kwaak .... F02N 15/006 |

* cited by examiner

ELECTRIC STARTER SYSTEM FOR MOTORCYCLES

BACKGROUND OF THE INVENTION

The invention relates to an electric starter system for a motorcycle with a mechanical kick-start device, in particular for a motorcycle of the Harley-Davidson brand with a four-speed transmission, in which the motorcycle has a transmission main shaft which rotates in a starting and drive rotational direction in order to start the motorcycle and during the normal operation of the cycle, and the kick-start device has a kick-start pinion and a kick-start clutch part, in which the kick-start pinion is configured for axial coupling to the kick-start clutch part and the kick-start clutch part is connected to the transmission main shaft in a torque-transmitting manner, and in which the electric starter system comprises an electric starter motor with a starter shaft pinion that can be driven thereby.

The invention also relates to an electric starter kit for retrofitting a motorcycle with a mechanical kick-start device, in particular a motorcycle of the Harley-Davidson brand with a four-speed transmission.

Finally, the invention relates to a motorcycle that is equipped, retrofitted, or provided with an electric starter system according to the invention or an electric starter kit according to the invention.

The invention relates to the area of motorcycles with internal combustion engines, with the term motorcycle generally being understood to mean motorized two-wheelers, such as scooters or mopeds. In contrast to electric motors for example, internal combustion engines cannot start themselves. To start internal combustion engines, it is therefore necessary to "start" the engine by triggering at least one intake and one compression stroke, i.e. to accelerate its crankshaft to the minimum speed required for this. The crankshaft can be accelerated using a device called a "starter." The starter is usually designed in the form of an electric motor, also referred to as an "electric starter," which is actuated via a start button, e.g. on the handlebar or on the electric motor itself, and the torque thereof is transmitted to the crankshaft to start the internal combustion engine.

Mechanical starters are also used for smaller engines, specifically on motorcycles. Mechanical starters in the form of a mechanical kick-start device, the so-called "kick starter," are particularly well known.

A kick starter is usually a lever consisting of a kick-start pedal and a kick-start shaft. When the driver steps on the kick-start pedal vigorously, a rotational movement of the kick-start shaft is generated, which is transmitted to the crankshaft in order to generate the speed required to start the internal combustion engine. In the case of Harley-Davidson motorcycles in particular, the engine and transmission are often housed in separate housings ("Big Twin"). In addition to the direct transmission to the crankshaft, the rotational movement can therefore also be transmitted indirectly via the main transmission shaft of the motorcycle transmission. The torque generated manually on the kick-start shaft is first transmitted to the main transmission shaft of the motorcycle, from which the rotational movement is then passed on to the crankshaft of the internal combustion engine via a so-called primary drive using a chain or belt.

The main transmission shaft and consequently also the crankshaft are rotated in a starting and drive direction of rotation for the starting process. The starting and drive direction of rotation corresponds to the direction of rotation in which the crankshaft or the main transmission shaft rotates during normal operation of the motorcycle, i.e. when the internal combustion engine is running and/or when driving forward. More rarely, there are also motorcycles that are equipped with a reverse gear. Even when reversing with the engine, the crankshaft and main transmission shaft rotate in the above starting and drive direction. The change in direction of travel is only implemented by the transmission and shifting into reverse gear. If, on the other hand, the motorcycle is pushed backwards manually, e.g. by muscle strength exerted by the driver, the rotation of the rear wheel would be transmitted to the main transmission shaft via the secondary chain and the main transmission shaft would rotate in a reverse direction opposite the starting and drive direction. By engaging the neutral gear, rotation of the main transmission shaft during reverse movement can be prevented immediately.

In order to prevent the kick-start pedal from "rotating as well" after the starting process and/or during normal operation of the motorcycle and to enable the kick-start pedal to be reset to its starting position, the kick-start shaft and the main transmission shaft are detachably connected to each other via a clutch connection of the kick-start device, known as a "kick-start clutch." The kick-start clutch is made up of a torque-transmitting kick-start clutch part sitting on the main transmission shaft with axially arranged and inclined transverse toothing (also referred to as "kick-start ratchet") and an axially opposite kick-start pinion with complementary transverse toothing. The kick-start pinion is rotatably mounted on the main transmission shaft, in particular via a bronze bushing, and is designed with end-face toothing for engaging a kick-start gear wheel. The kick-start gear wheel is, in turn, seated on the kick-start shaft to which the kick-start pedal is attached, as described above, in a torque-transmitting manner, in particular positively and/or non-positively. Due to the intermeshing transverse toothing between the kick-start clutch part and the kick-start pinion, which forms a freewheel in the drive direction of rotation of the main transmission shaft, the kick-start pedal can be prevented from rotating at the same time immediately after the starting process. During normal operation, i.e. when the internal combustion engine is running, the kick-start clutch is axially released.

Such kick starters were necessary before the invention of the electric starter and have already been used for decades as a starter for starting the internal combustion engine of a motorcycle. Even today, many older motorcycles, particularly Harley Davidson motorcycles, are equipped with a kick starter.

Because of increased comfort, there is a need to retrofit older motorcycles equipped with a kick-start device with an electric starter system. At the same time, experts place great importance on maintaining the full functionality of the original kick starter when retrofitting with an electric starter and replacing or changing as few original components or original parts of the motorcycle as possible.

An electric starter system for retrofitting Harley-Davidson motorcycles with a kick starter is known from the prior art, e.g. from DE 20 2016 104 454 U1. In order to make efficient use of the space available on the original motorcycle, various modifications for the installation of the electric starter system are mainly made on the left side of the motorcycle as viewed in the direction of travel. The function of the original kick starter is retained, the torque of which is usually delivered to the main transmission shaft on the right side of the motorcycle via the kick-start clutch. On the left side of the motorcycle, torque is transmitted from the electric motor to the main transmission shaft by modifying the clutch hub. Said clutch hub is welded, inter alia, to an additional starter ring gear with which the starter shaft pinion of the electric motor engages during the starting process. In order to create the space required for the starter ring gear, the entire clutch of the motorcycle on the main transmission shaft must be moved to the left as viewed in the direction of travel. As a result, the output pinion of the internal combustion engine itself must also be shifted to the left accordingly for correct alignment. Further modifications require the installation of an additional chain tensioner and the adaptation of the original oil tank.

The object of the present invention is to improve electric starter systems for motorcycles, in particular to be able to install or retrofit them in a motorcycle with a kick-start device with fewer modifications to the original components, less expenditure of time, and/or easier or faster.

SUMMARY OF THE INVENTION

The object is achieved by means of an electric starter system according to claim 1, an electric starter kit according to claim 10, and a motorcycle according to claim 15.

A starter system according to the invention of the type described at the outset is characterized in that a torque of the electric starter motor can be transmitted from the starter shaft pinion, preferably at the end face, to the kick-start clutch part, in particular via interposed starter gearing.

According to the invention, the torque required to start the internal combustion engine is thus provided with an electric starter motor and transmitted to the main transmission shaft via the kick-start clutch part of the mechanical kick-start device. This proves to be particularly favorable because the kick-start clutch part, as a component of the kick-start device, is connected to the main transmission shaft in a fixed or torque-transmitting manner for transmitting the torque from the kick starter to the main transmission shaft.

The number of modifications to be made to the original components and/or the number of original components to be replaced can be minimized by using the torque-transmitting connection to the main transmission shaft already provided in the original version of the motorcycle to transmit the torque applied by the electric starter motor. In particular, it is not necessary to connect additional components such as gears or ring gears to the main transmission shaft. According to the invention, the conversions or modifications to be undertaken are implemented exclusively on the side of the motorcycle on which the mechanical kick-start device is installed. Usually this is the right side as viewed in the direction of travel of the motorcycle. For this reason, for example, an offset of the clutch of the motorcycle can be avoided, which means that conversions that would otherwise be required, such as the installation of a chain tensioner and/or modifications to the output pinion of the internal combustion engine, are not necessary. Modifications of the original components of the motorcycle are preferably only necessary to the components of the mechanical kick-start device. This is particularly advantageous because a conversion of the kick-start device is much easier and less complicated to implement than, for example, changes to the clutch or clutch basket and/or primary drive. Since the electric starter system engages the kick-start clutch part itself or acts on it in a torque-transmitting manner, the electric starter system according to the invention can be implemented in a more compact design and/or the electric starter motor can be selected to be smaller.

As a result, an electric starter system according to the invention with structural changes that are particularly difficult to perceive visually can be integrated into the mechanical kick-start device, as a result of which the appearance of the motorcycle remains almost unchanged. Especially for owners of old Harley-Davidson motorcycles, which are also traded as collector's items in specialist circles, an optimal compromise can be achieved between driving comfort and the almost complete preservation of the original components, their functionality, and the visual appearance. The electric starter system according to the invention is particularly advantageously suitable as a starting aid for four-speed Big Twin Harley-Davidson motorcycles.

Advantageous embodiments of the invention are claimed in the respective dependent claims and are explained in more detail below.

In motorcycles with a kick starter, the torque of the mechanical kick-start device is usually transmitted axially, via the kick-start clutch, i.e. via the axially arranged and mutually complementary transverse toothing between the kick-start pinion and the kick-start clutch part. In order to optimally utilize the available installation space, it is therefore advantageous that the torque of the electric starter motor is also transmitted to the kick-start clutch part, but at the end face, in particular via a spur gear of the electric starter system called "starter gearing." The starter gearing can be interposed between the starter shaft pinion, which is located at the output of the electric starter motor, and the kick-start clutch part.

Thus, according to an advantageous embodiment of the invention, the electric starter motor can be arranged axially parallel to the main transmission shaft and its torque can be transmitted to the kick-start clutch part, which is connected to the main transmission shaft in a torque-transmitting manner, via one or more stages of interposed starter gearing, preferably a spur gear, of the electric starter system.

In this embodiment, the electric starter motor is arranged behind the transmission with respect to the direction of travel of the motorcycle, the main transmission shaft and the starter shaft of the electric starter motor being aligned parallel to one another. Starting from the starter shaft pinion provided on the starter shaft of the electric starter motor, the torque is transmitted to the kick-start clutch part via the preferably multi-stage starter gearing, and then transferred from the kick-start clutch part to the main transmission shaft. With a corresponding gear ratio, the starter gearing is used, on the one hand, to convert the speed of the electric starter motor into the torque required on the main transmission shaft, and, on the other hand, the distance can be bridged between the starter shaft of the electric starter motor and the main transmission shaft. For this purpose, the starter gearing is expediently designed as a spur gear so that the torque can be transmitted to the kick-start clutch part at the end face. With this configuration, an overall compact design of the starter gearing and thus of the entire electric starter system can be achieved. Since the torque is transmitted over shorter distances overall, the internal combustion engine can be started in a particularly smooth and quiet manner.

It is also advantageous if, according to a further embodiment of the invention, the electric starter system has a starter ring gear that surrounds the kick-start clutch part coaxially for torque-transmitting engagement with a starter gear wheel of the starter gearing, in particular the spur gear, or with the starter shaft pinion of the electric starter motor.

In this embodiment, the kick-start clutch part is provided with a ring gear called a "starter ring gear" along the circumference of the kick-start clutch part, i.e. at the end face, and it is designed to engage a gear wheel of the starter gearing called a "starter ring gear." The starter gear wheel and the starter ring gear preferably form a pair of gear wheels which are coupled to one another at the end face or which engage with one another.

In order to prevent the rotation of the crankshaft while the internal combustion engine is running, i.e. during normal operation of the motorcycle, from being transferred back to the electric starter motor via the main transmission shaft and thus leading to an undesired rotation of the electric starter motor or to damage thereof, it is advantageous for function if, according to an embodiment of the invention, the electric starter system has a starter freewheel device. The starter freewheel device is interposed between the electric starter motor, in particular the starter shaft pinion, and the kick-start clutch part, so that a torque-transmitting coupling is formed from the electric starter motor to the kick-start clutch part in the starting and drive direction of rotation of the main transmission shaft, and a free-running coupling is formed from the kick-start clutch part to the electric starter motor.

In order to achieve a complete decoupling between the electric starter motor and the kick-start clutch part, it would be conceivable, for example, to allow an axial offset between the starter shaft pinion and the kick-start clutch part. In particular, the starter shaft pinion and/or a starter pinion engaging the starter gear wheel could be designed to be linearly displaceable, so that they are arranged in an intermeshed manner for transmitting the torque and the rotational movement from the electric starter motor to the kick-start clutch part or are arranged offset from one another in order to transmit a torque and to prevent rotational movement from the kick-start clutch part to the electric starter motor. As an alternative and in a more space-saving manner, the starter freewheel device can also be arranged coaxially surrounding the kick-start clutch part.

In a refinement, the starter freewheel device is therefore designed in the manner of a sprag or pinch roller freewheel, in particular a roller bearing freewheel, and surrounds the kick-start clutch part coaxially, with a rotational movement of the main transmission shaft being blocked, in particular in a reverse direction opposite to the starting and drive direction.

It is particularly useful here that the starter freewheel device has a radially outer raceway and a radially inner raceway, the radially outer raceway being connected, in a torque-transmitting manner, to the starter ring gear of the electric starter system and the radially inner raceway being connected, in a torque-transmitting manner, to the kick-start clutch part of the kick-start device.

The starter freewheel device can preferably be designed as a single-row or double-row rolling element freewheel, with one or two running channels being provided between the radially outer raceway and the radially inner raceway accordingly, and with rolling elements, in particular cylinders or balls, being arranged within the running channels. In the starting and drive direction of rotation of the main transmission shaft and for starting the internal combustion engine, i.e. when the rotational movement of the electric starter motor is to be transmitted to the main transmission shaft, the rolling element freewheel "jams," thus blocking a relative movement between the radially outer and radially inner raceway. This enables transmission of the rotational movement or the torque of the electric starter motor from the starter freewheel device to the kick-start clutch part and the main transmission shaft connected thereto. As soon as the internal combustion engine is started and the main transmission shaft is driven by the internal combustion engine or when the speed of the radially inner raceway exceeds the speed of the radially outer raceway, the starter freewheel device automatically releases and the rolling elements roll freely within the raceways, so that even though the kick-start clutch part seated on the main transmission shaft rotates with the main transmission shaft, the rotational movement or the torque is not transmitted to the radially outer raceway or to the starter ring gear connected thereto. The starter freewheel device acts here as an overrunning clutch. Damage to the electric starter motor can be prevented by providing a starter freewheel device of this type, particularly advantageously designed as a roller bearing freewheel, between the starter gearing and the main transmission shaft of the motorcycle. In addition, a roller bearing freewheel has very smooth running, as a result of which an overall lower level of noise is achieved both during the starting process and during normal operation when the internal combustion engine is running.

In addition, according to an optional variant of the invention, the starter freewheel device can also have the function of a backstop. In this case, a rotational movement of the main transmission shaft is only possible in the starting and drive direction of rotation, whereas a reverse rotational movement in the opposite reverse direction is blocked. In the reverse direction of the main transmission shaft, the rolling element freewheel "jams" as long as the torque is applied to the radially inner raceway. In particular, due to the interposed, multi-stage starter gearing, which has a reduction effect in this direction, a sufficiently high starting resistance is generated so that the main transmission shaft can be blocked in the reverse direction by means of the starter freewheel device. This function has the advantage that unwanted rotation of the electric starter motor in the reverse direction is prevented. The motorcycle can still be pushed backwards by shifting into neutral, i.e. decoupling the main transmission shaft from the rear wheel.

Furthermore, another advantageous embodiment of the invention provides that the electric starter system has an adapter plate which is arranged between a cover of the kick-start device and a transmission housing of the motorcycle, and the electric starter motor is attached to the transmission housing of the motorcycle by means of the adapter plate.

In order to accommodate the electric starter motor in the space available in a manner so as to save as much space as possible, it is expedient to mount it behind the motorcycle transmission, preferably behind the transmission housing, as viewed in the direction of travel of the motorcycle. The electric starter motor is advantageously attached by means of an adapter plate which is arranged on the transmission housing, in particular screwed to the transmission housing, e.g. via stud bolts, on the motorcycle side with the mechanical kick-start device, usually on the right-hand side as viewed in the direction of travel of the motorcycle. For this purpose, the adapter plate can have an outer circumference which essentially corresponds to the outer circumference of the cover of the kick-start device, also called the "kick-starter lid," in order to be flush thereto. In addition, the adapter plate has a lateral extension which is designed as a fastening section in order to be connected, in particular screwed, to the electric starter motor. The adapter plate thus represents the only connection to the electric starter motor and should be designed with a minimum thickness of 10 mm, for example, in order to withstand the torque applied and the forces occurring at the connection site. The adapter plate preferably has a thickness between 15-20 mm, especially preferably around 20 mm. Due to the adapter plate, the distance between the kick-start cover and the housing cover increases. Therefore, in order to fasten the kick-start cover to the housing cover with the adapter plate in between, and within the recesses provided on the original transmission housing, fastening means, in particular stud bolts, are to be used which are longer than the originally provided fastening means. For this reason, it may be necessary to adapt the exhaust system on some types of motorcycle. A seal is advantageously provided both between the kick starter cover and the adapter plate and between the adapter plate and the transmission housing.

Further advantageous functions of the adapter plate are also the protection and accommodation of the starter gearing, the starter freewheel device, and/or the kick-start clutch part.

In a refinement of the above exemplary embodiment, the adapter plate therefore expediently has a mounting area for mounting the starter freewheel device and/or for mounting the starter ring gear and/or forms such a mounting area.

In addition, the adapter plate can be connected, in particular detachably, to one or more starter connectors, which are intended to accommodate further gear elements of the starter gearing and/or to connect to the electric starter motor, in particular to its output-side starter shaft pinion, and which together form a starter gearing housing.

In order to facilitate the retrofitting of older motorcycles, particularly Big Twin Harley-Davidson motorcycles with four-speed transmissions, with an electric starter system and also to simplify the installation and removal or replacement of defective and/or worn components with spare parts, the electric starter system can have, according to a variant of the invention, a kick-start shaft with a removable spring seat for mounting a kick-start spring, the kick-start shaft being designed for a torque-transmitting connection to a kick-start gear wheel.

In the original version of the mechanical kick-start device, provision is made for the kick-starter cover, i.e. the kick-starter lid, to be removed together with the kick-start shaft and the kick-start gear wheel attached thereto for torque transmission. However, due to the components of the electric starter system additionally attached to the kick-start clutch part according to the invention, in particular due to the starter ring gear and/or the starter freewheel device, which coaxially surround the kick-start clutch part, the circumference of the kick-start clutch part is increased as compared to the original component, the kick-start ratchet. As a result, the kick-start gear wheel is overlapped along the kick-start shaft in front of the kick-start clutch part such that it is no longer possible to remove the kick-start shaft together with the kick-start gear wheel and together with the kick-starter cover.

This is remedied in that the spring seat to which the kick-start spring is attached is designed to be removable or detachable from the kick-start shaft. In order to continue to have access to the original components of the kick-start device arranged behind the kick-starter cover and the components of the electric starter system, the kick-starter lid or the kick-starter cover can be removed in this embodiment for retrofitting, converting, and replacing the components by removing the spring seat beforehand via the kick-start shaft without removing the kick-start shaft itself.

In order to provide a motorcycle, in particular a motorcycle of the Harley-Davidson brand with a four-speed transmission, with an electric starter system and to maintain the function of the mechanical kick-start device at the same time, the original motorcycle can expediently be retrofitted with an electric starter system according to the invention, with the electric starter system being at least partially integrated into the mechanical kick-start device.

The object of the invention presented at the beginning is, therefore, also achieved by means of an electric starter kit for retrofitting a motorcycle with a mechanical kick-start device, in particular a motorcycle of the Harley-Davidson brand with a four-speed transmission, in which the motorcycle has a main transmission shaft which rotates in a starting and drive direction of rotation for starting the motorcycle and during normal operation of the motorcycle.

According to the invention, the electric starter kit comprises an electric starter motor with a starter shaft pinion which can be driven thereby, a kick-start clutch part with a starter freewheel device, in which the kick-start clutch part is formed for the torque-transmitting connection to the main transmission shaft and the starter freewheeling device is formed for coupling the kick-start clutch part to the starter shaft pinion, in particular at the end face, and an adapter plate which is designed to connect the electric starter motor to a transmission housing of the motorcycle and/or to mount the kick-start clutch part with a starter freewheel device.

According to the invention, the kick-start clutch part itself is part of the electric starter kit and is designed for axial engagement with a kick-start pinion of the mechanical kick-start device and is formed at the end face for a torque-transmitting coupling with the electric starter motor. The kick-start clutch part is also equipped with a preferably integrated starter freewheel device. In particular, the starter freewheel device can coaxially surround the kick-start clutch part in the manner of a roller bearing freewheel, with a radially inner raceway being connected to the kick-start clutch part in a torque-transmitting, positive, and/or non-positive manner. Alternatively, the kick-start clutch part and the radially inner raceway can also be formed in one piece. The radially outer raceway preferably has external toothing in the form of a ring gear at its end-face surface or is connected to a ring gear that coaxially surrounds the radially outer raceway in a torque-transmitting, positive, and/or non-positive manner.

In the axial direction, the kick-start clutch part is provided with transverse toothing which is designed to be complementary to transverse toothing of the original kick-start pinion and which can engage with it in a positive-locking manner. In the drive direction of rotation of the main transmission shaft, the transverse toothing forms a freewheel between the kick-start clutch part and the kick starter; likewise in the drive direction of rotation of the main transmission shaft, the starter freewheel device is provided for forming a freewheel between the kick-start clutch part and the electric starter motor. The kick-start clutch part with integrated starter freewheel device thus represents the central link between the electric starter system and the mechanical kick-start device.

In an advantageous embodiment, the electric starter kit is preassembled, in which the adapter plate, in particular via one or more starter connectors, is connected to the electric starter motor, preferably detachably, and/or the kick-start clutch part with the starter freewheel device is arranged within a mounting area of the adapter plate designed for this purpose.

Retrofitting the motorcycle is considerably simplified by virtue of the fact that the components of the electric starter kit are already preassembled, at least for the most part. The conversion or integration of the electric starter kit into the mechanical kick-start device can also be carried out by the user without special technical knowledge and/or without special tools, such as welding equipment, for example. It is not absolutely necessary to find a specialized workshop.

According to a further advantageous variant, the electric starter kit comprises a starter gear wheel and a starter ring gear, in which the starter ring gear is arranged coaxially surrounding the kick-start clutch part and the starter freewheel device, and the starter gear wheel is designed or can be arranged as part of starter gearing for engaging the starter shaft pinion of the electric starter motor and for engaging the starter ring gear.

In order to make retrofitting as well as removal and installation as simple and uncomplicated as possible, the electric starter kit according to an advantageous embodiment of the invention also includes a kick-start shaft with a removable spring seat, the kick-start shaft being designed for torque-transmitting connection to a kick-start gear wheel of the kick-start device.

As additional components to compensate for the adapter plate to be arranged between the transmission housing and the kick-starter lid, the electric starter kit can be a kick-start shaft and/or a brake shaft and/or a transmission clutch actuation lever and/or a clutch push rod for respectively replacing the corresponding original components of the motorcycle as required and/or as desired.

Compared to the original components, the kick-start shaft and/or the brake shaft and/or the transmission clutch actuation lever and/or the clutch push rod are preferably each extended by the thickness of the adapter plate, in particular by 10-20 mm.

Finally, the object set out at the beginning is also achieved according to the invention by means of a motorcycle that is equipped, retrofitted, or provided with an electric starter system according to one of the above embodiments or an electric starter kit according to one of the above variants.

BRIEF DESCRIPTION OF THE SEVERAL VIEWS OF THE DRAWINGS

Further details, features, feature (sub-)combinations, advantages, and effects based on the invention will be apparent from the following description of preferred exemplary embodiments and from the drawings. The following is shown FIG. 1 a schematic perspective view of an exemplary embodiment of the electric starter system according to the invention with an adapter plate and mounted on the transmission housing of the motorcycle, but without a cover for the kick-start device.

The figures are merely exemplary in nature and are only used for understanding the invention. The same elements are provided with the same reference numerals.

DETAILED DESCRIPTION OF THE INVENTION

Figure 1:
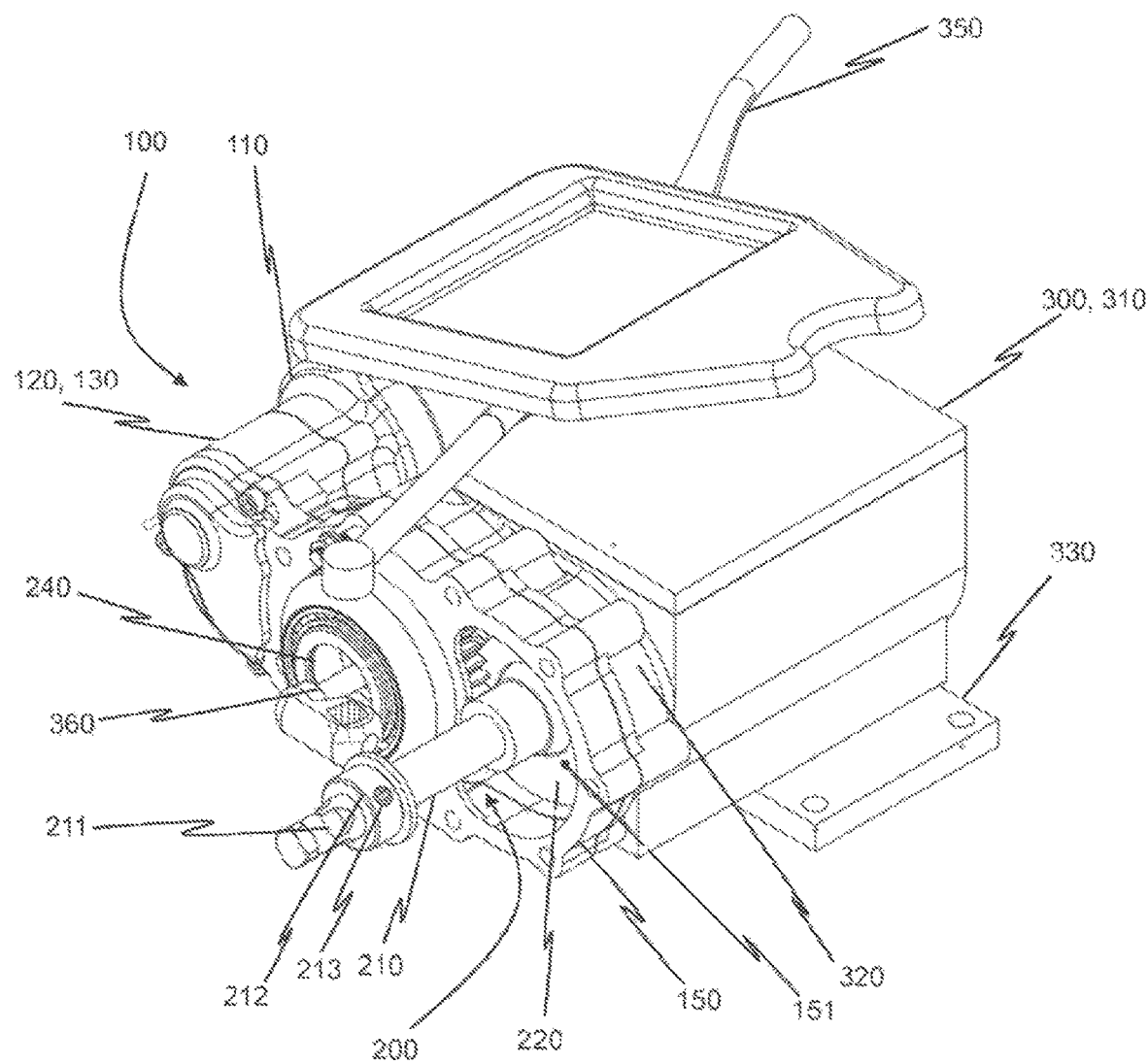

FIG. 1 shows a schematic perspective view of an exemplary embodiment of the electric starter system 100 according to the invention with an adapter plate 150 and mounted on the transmission housing 310 of the motorcycle, which is not shown here. The figure is shown obliquely from above from the perspective of the motorcycle front and the mechanical kick-start device 200, the latter usually being arranged on the right side of the motorcycle as viewed in the direction of travel. In addition to the adapter plate 150, the electric starter system 100 includes an electric starter motor 110 and starter gearing 120 which is arranged within a starter gearing housing 130. The electric starter motor 110 is arranged behind the transmission housing 310 as viewed in the direction of travel of the motorcycle. The transmission housing 310 surrounds the essential components of the transmission 300 of the motorcycle and sits on a transmission base plate 330. The adapter plate 150 has an outer circumference which essentially corresponds to the circumferential shape of an adapter section 320 of the transmission housing 310 and is fastened to the latter in a flush manner, for example by means of screws or stud bolts. Also shown in the figure are the transmission clutch actuation lever 350 and the clutch push rod 360.

Components of the mechanical kick-start device 200 are also arranged in the adapter section 320 of the transmission housing 310, in particular the kick-start gear wheel 220, which is connected to the kick-start shaft 210 in a positive and/or non-positive manner for torque transmission. The kick-start shaft 210 protrudes from a kidney-shaped recess 151 of the adapter plate 150 and has a pedal connector 211 at its outer end to mount a kick-start pedal, not shown, in a positive-locking manner. A spring seat 212 is also provided on the kick-start shaft 210 for connection to the kick-start spring, which is also not shown. The spring seat 212 can preferably be pulled off the kick-start shaft 210 via the pedal connector 211 and is detachably connected to the kick-start shaft 210 for this purpose, in particular by means of a grub screw 213. Not visible in the illustration is the kick-start pinion, which is rotatably mounted to engage the kick-start gear wheel 220 on the main transmission shaft 340 of the transmission 300, which is also not visible here. The kick-start pinion, together with the kick-start clutch part 240, forms a kick-start clutch, the kick-start clutch part 240 being connected to the transmission main shaft 340 in a rotationally fixed or torque-transmitting manner in order to transmit the torque.

Figure 2:
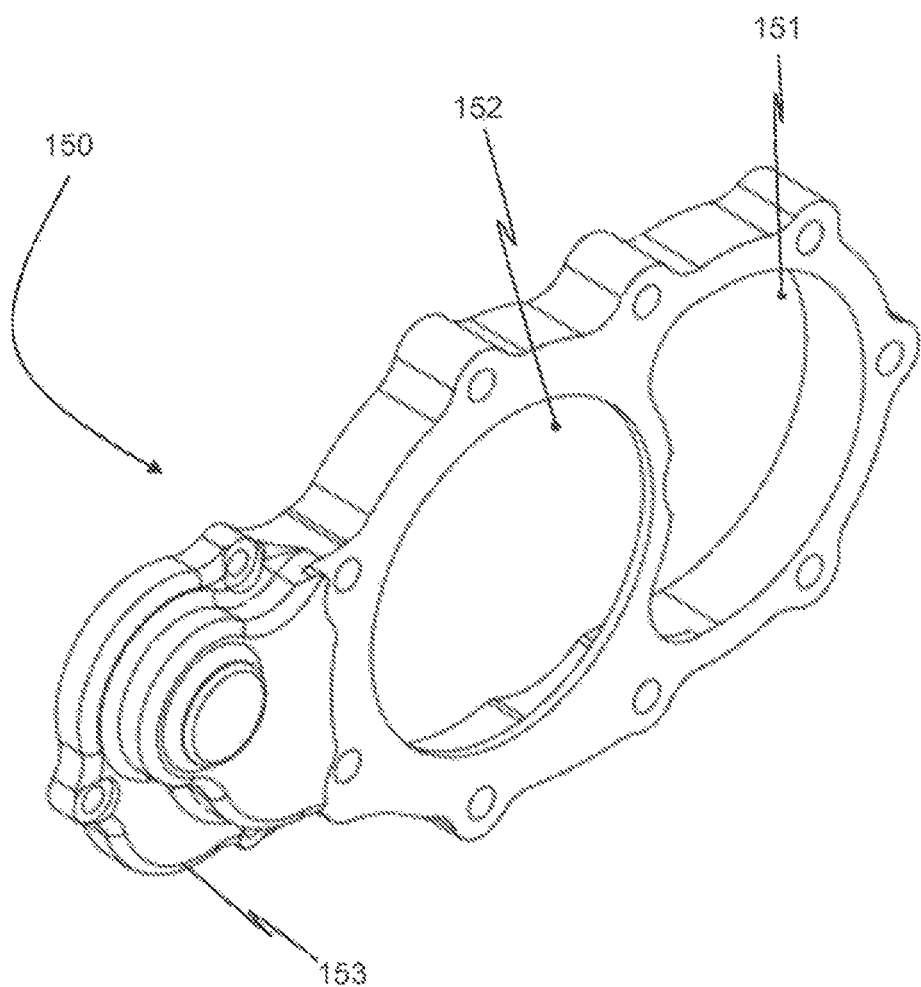
FIG. 2 a schematic perspective individual view of the adapter plate from FIG. 1.

A schematic, perspective detailed view of the adapter plate 150 from FIG. 1 can be seen in FIG. 2 The adapter plate 150 comprises the kidney-shaped recess 151, which is penetrated by the kick-start shaft 210 in the installed state, a mounting area 152 which is designed and shaped to mount the kick-start clutch part 240, and a fastening section 153 which is provided for fastening to the electric starter motor 110 and, at the same time, forms a final section of the starter gearing housing 130. Via the fastening section 153, the adapter plate 150 thus represents the only connection between the electric starter motor 110 and the transmission housing 310; in other words, the electric starter motor 110 is fastened exclusively to the fastening section 153 of the adapter plate 150. In order to withstand the torque applied by the starter motor 110 and the forces occurring between the fastening section 153 and the mounting area 152, the adapter plate is designed, at least at this point, with a minimum thickness of 10 mm, for example. The adapter plate preferably has a thickness between 15-20 mm, especially preferably a thickness of around 20 mm.

Figure 3:
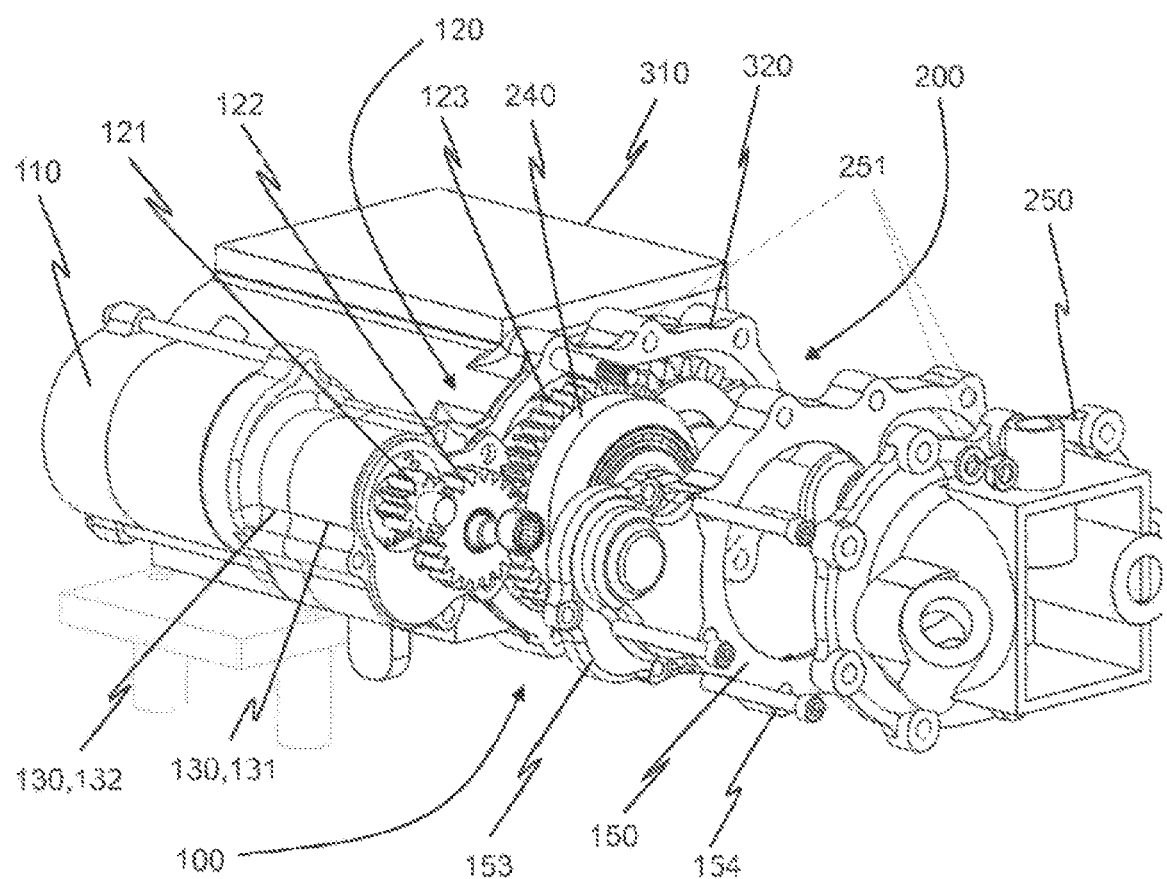
FIG. 3 a schematic perspective exploded view of the exemplary embodiment of the electric starter system according to the invention from FIG. 1, together with a cover for the kick-start device.

FIG. 3 shows a schematic, perspective exploded view of the exemplary embodiment of the electric starter system 100 according to the invention from FIG. 1, a cover 250 of the mechanical kick-start device 200 being additionally shown. The figure is shown obliquely from the perspective of the rear of the motorcycle and the kick-start device 200. The adapter plate 150 is arranged between the cover 250 and the transmission housing 310, as a result of which the original distance between the two original components (cover 250 and transmission housing 310) is increased by the thickness of the adapter plate 150. Fastening means 251 are to be used to fasten the kick-start cover 250 with the adapter plate 150 lying therebetween within the recesses provided on the adapter section 320 of the transmission housing 310. A stud bolt with a spring washer and nut is shown as an example of the fastening means 251. The fastening section 153 of the adapter plate 150 is used to fasten the electric starter motor 110 by means of three screws 154. The electric starter motor 110 is preferably screwed to the fastening section 153 indirectly via the starter gearing housing 130, the starter gearing housing 130 being designed in two parts, with a first starter connector 131 which is assigned to the fastening section 153 and a second starter connector 132 which is assigned to the electric starter motor 110.

Furthermore, FIG. 3 shows a part of the starter gearing 120 of the electric starter system 100 arranged within the starter gearing housing 130. The starter gearing 120 comprises a starter pinion 121 which, together with the starter gear wheel 122, forms a pair of gear wheels in order to transmit the torque of the electric starter motor 110, which torque is picked up on the starter shaft pinion 112 of the electric starter motor 110, which is not visible in this figure, at the end face of the kick-start clutch part 240 (see also FIG. 5). To this end, the starter gear wheel 122 engages, with its external toothing, in a starter ring gear 123 which surrounds the kick-start clutch part 240 along the end face thereof. The remaining components of the starter gearing 120 are shown in FIG. 6 and explained in more detail at the corresponding point.

Figure 4:
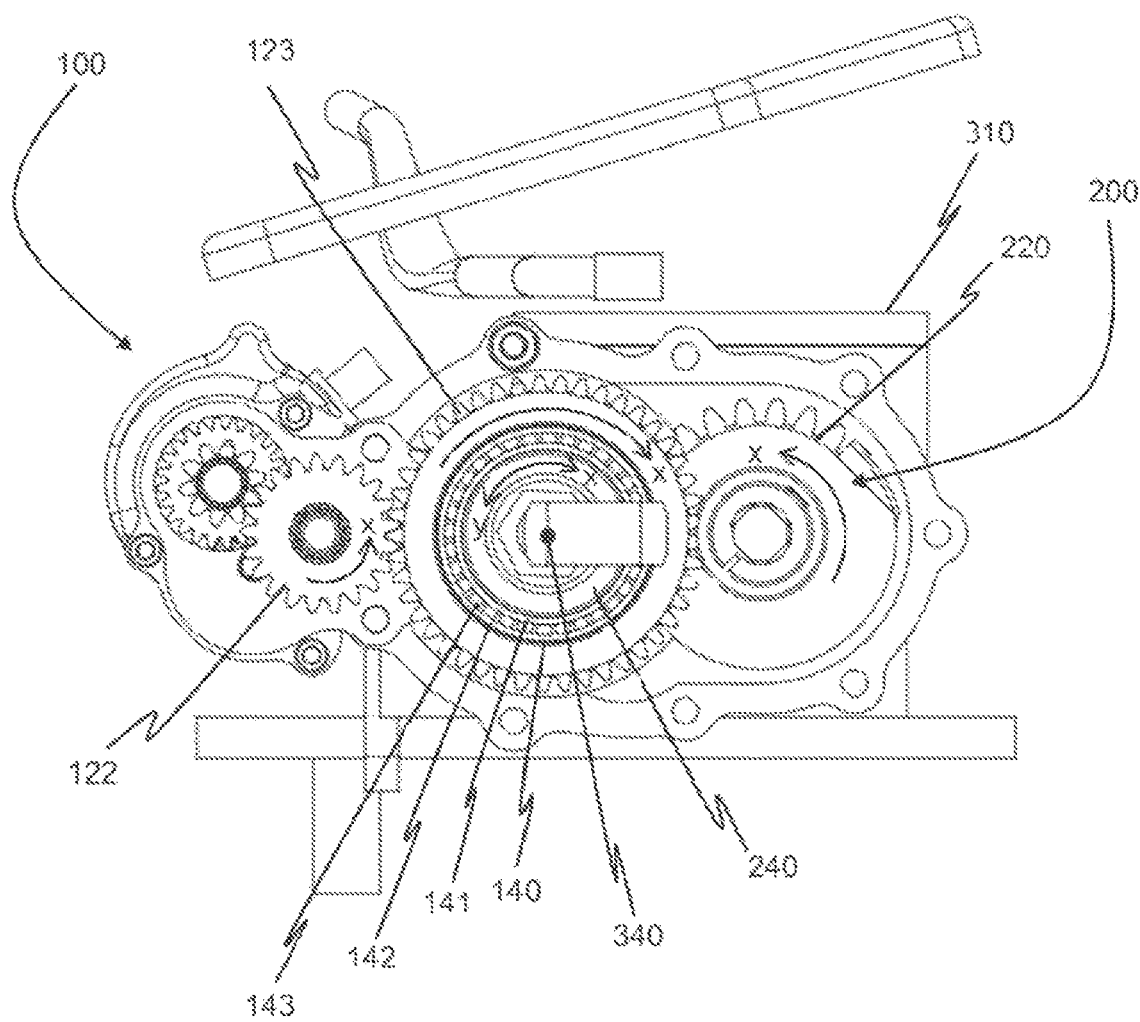
FIG. 4 a schematic side view of the exemplary embodiment of the electric starter system according to the invention from FIG. 1, but without an adapter plate.

In FIG. 4, which shows a schematic side view of the exemplary embodiment of the electric starter system 100 according to the invention from FIG. 1, the directions of rotation of the main transmission shaft 340 are shown. To start the internal combustion engine, the main transmission shaft 340 is rotated by the electric starter system 100 or, alternatively, by means of the mechanical kick-start device 200 in a starting and drive direction of rotation x. Even during normal driving or when the internal combustion engine is running, the main transmission shaft 340 rotates together with the crankshaft in the starting and drive direction of rotation x. If, on the other hand, the motorcycle is pushed backwards, the rotational movement of the rear wheel would be transmitted to the main transmission shaft 340 in an opposite reverse direction y when a gear is engaged. The kick-start clutch part 240 is mounted in a torque-transmitting manner on the main transmission shaft 340. The kick-start clutch part 240 is surrounded coaxially by a starter freewheel device 140 designed as a roller bearing freewheel. The starter freewheel device 140 has a radially inner raceway 142 and a radially outer raceway 141, which form two running channels in the embodiment shown here as a two-row rolling element freewheel, with the rolling elements 143, balls in this case, being arranged within the running channels. The radially inner raceway 142 is connected to the kick-start clutch part 240 in a torque-transmitting manner. The connection can be designed in a non-positive and/or positive manner, for example as a press fit; alternatively, it is also conceivable to form the kick-start clutch part 240 in one piece with the inner raceway 142. The radially outer raceway 141 is, in turn, connected non-positively and/or positively, for example as a press fit or alternatively in one piece, to the starter ring gear 123 in a torque-transmitting manner. The external toothing of the starter gear wheel 122 engages the starter ring gear 123 at the end face. In the starting and drive direction of rotation x of the main transmission shaft 340, the starter freewheel device 140 functions as an overrunning clutch and "jams" as long as the radially outer raceway 141 is running faster than the radially inner raceway 142. As a result, a relative movement between the radially outer raceway 141 and the radially inner raceway 142 is blocked, and the rotational movement and the torque can be transmitted from "radially outside" to "radially inside." In order to start the internal combustion engine, a torque generated by the electric starter motor 110 can thus be transmitted to the main transmission shaft 340 in the starting and drive direction of rotation x. As soon as the speed of the main transmission shaft 340 is sufficiently high or the internal combustion engine itself has started and is driving the main transmission shaft 340, the radially inner raceway 142 "overtakes" the radially outer raceway 141, whereby the starter freewheel device 140 automatically releases the connection, i.e. the rolling elements 143 roll freely within the running channels. In this case, a transmission of the rotational movement or the torque from "radially inside" to "radially outside," i.e. from the main transmission shaft 340 to the electric starter motor 110 in the starting and drive direction of rotation x, is prevented and thus damage to same is avoided. In order to prevent a rotation of the main transmission shaft 340 in the reverse direction y and thus prevent any damage to the electric starter motor 110 when the motorcycle is pushed backwards with the forward gear engaged, the starter freewheel device 140 functions as a backstop when the forward gear is engaged and "jams," provided that the radially inner raceway 142 inversely runs faster than the radially outer raceway 141 or the reverse rotational movement is transmitted from the rear wheel of the motorcycle to the main transmission shaft 340. The actual blocking of the main transmission shaft 340 in the reverse direction y then takes place via an end stop of the kick-start gear wheel 220. For this purpose, the kick-start gear wheel 220 is provided with a stop bolt 221 which is designed to run up against a correspondingly corresponding stop surface within the cover 250 of the kick-start device 200. The stop bolt 221 and the stop surface together create the end stop which, on the one hand, sets the standby position of the kick-start gear wheel 220 in driving mode after the starting process, but, on the other hand, also blocks the main transmission shaft 340 in the reverse direction y. In order to still be able to push the motorcycle backwards, the user can switch to neutral as usual. In the viewing direction of FIG. 4, the kick-start gear wheel 220 is arranged behind the starter freewheel device 140 or between the starter freewheel device 140 and the transmission housing 310, the kick-start gear wheel being partially overlapped by the starter freewheel device 140 with the starter ring gear 123.

Figure 5:
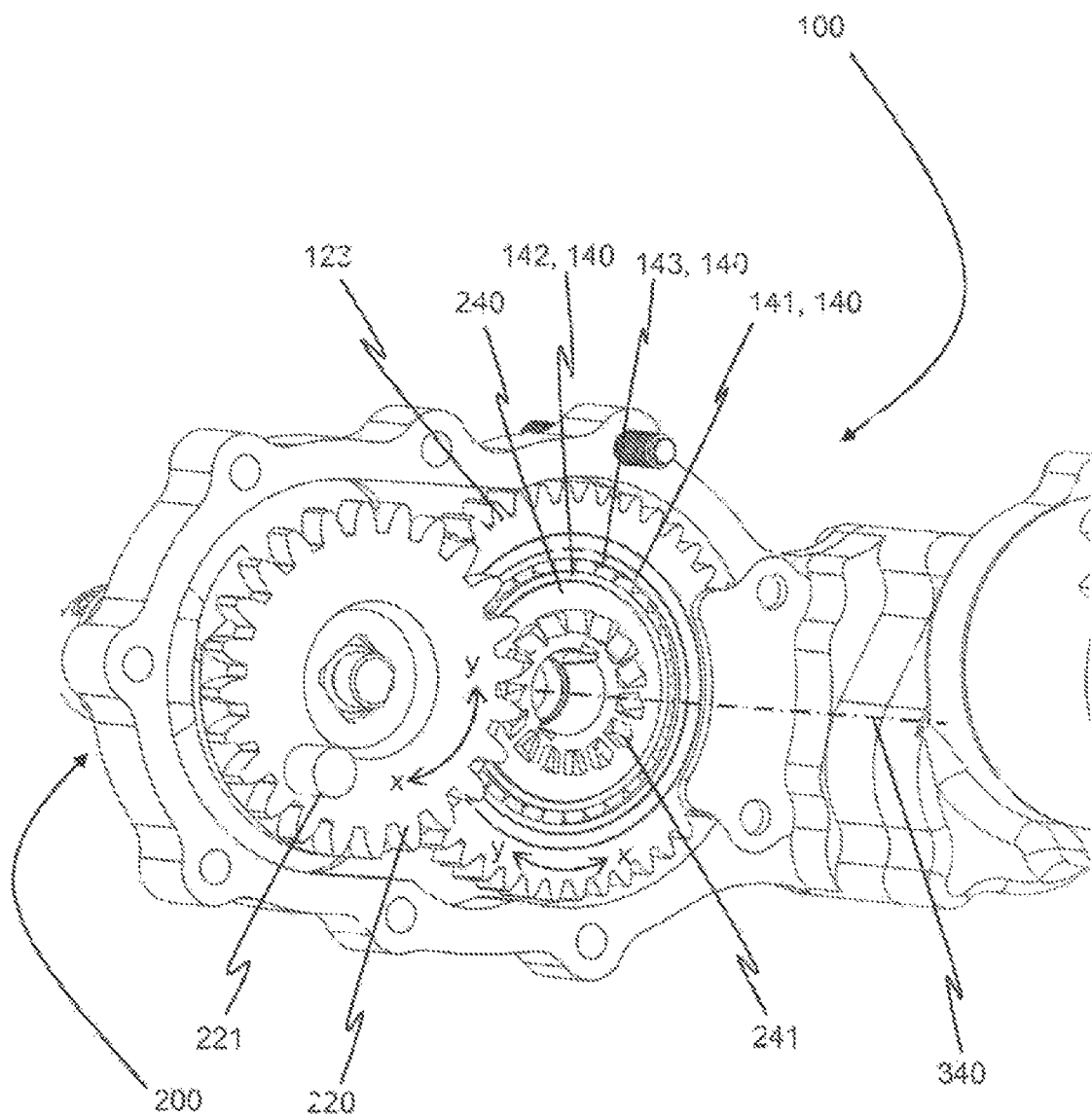
FIG. 5 a schematic perspective view of the exemplary embodiment of the electric starter system according to the invention according to FIG. 1, from the perspective of the transmission housing.
Figure 6:
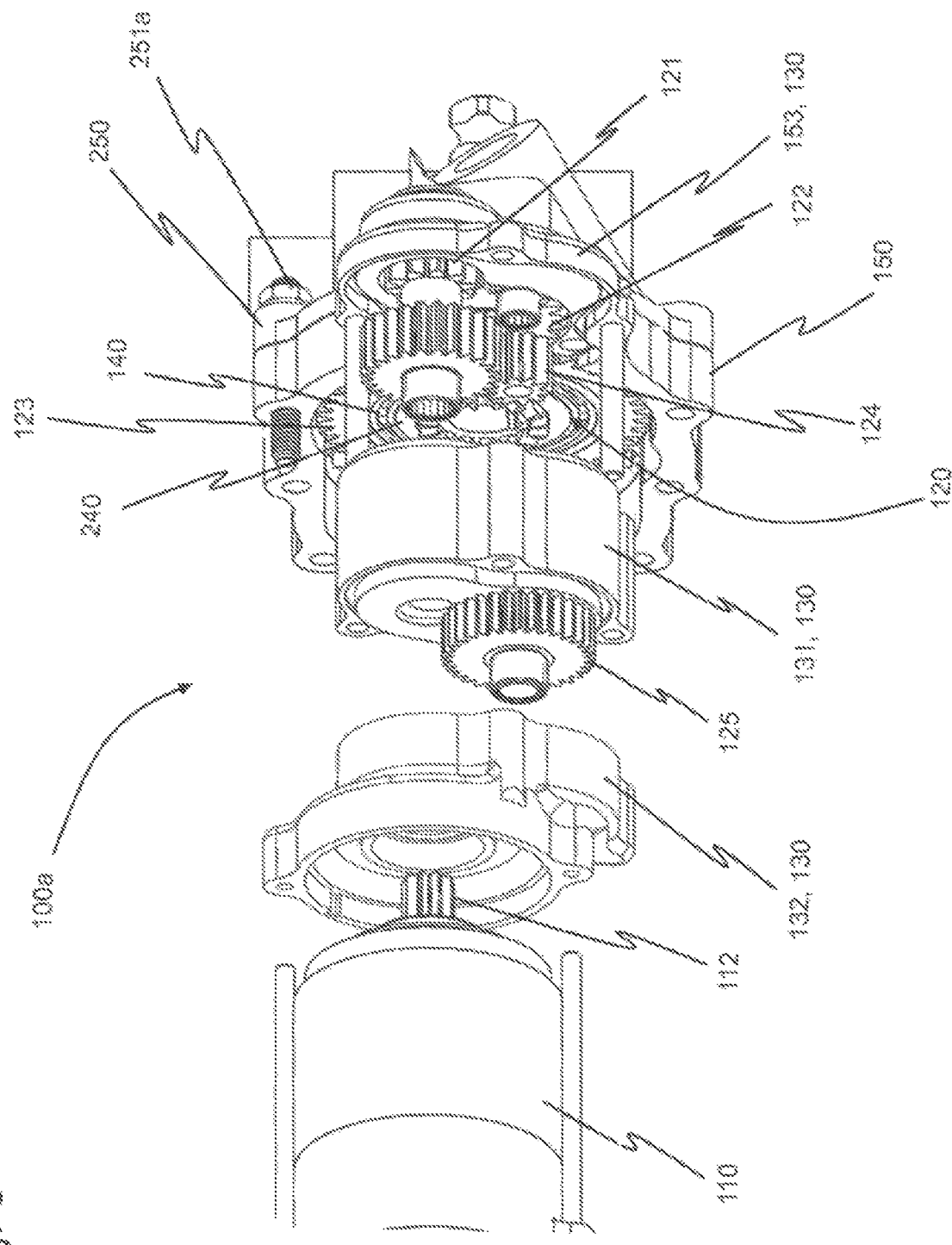
FIG. 6 a schematic perspective exploded view of an exemplary embodiment of an electric starter kit according to the invention, mounted on a cover of the kick-start device.

According to FIG. 5, a schematic perspective illustration of the exemplary embodiment of the electric starter system 100 according to the invention from FIG. 1 is shown from the opposite side, i.e. from the perspective of the transmission housing 310, which is not shown here. In particular, the kick-start clutch part 240 is shown, which is surrounded coaxially along a radius originating from the main transmission shaft 340, indicated here by dashed lines, initially by the radially inner raceway 142, the rolling elements 143, and the radially outer raceway 141, which together form the starter freewheel device 140. Finally, the starter ring gear 123 is arranged with end-face toothing on the outer circumference. In the axial direction, the kick-start clutch part 240 is provided with transverse toothing 241, which is designed to be complementary to transverse toothing of the original kick-start pinion, which is not shown here, of the mechanical kick-start device 200. The original kick-start pinion is rotatably mounted on the main transmission shaft 340, indicated here by dashed lines, and can be axially displaced along the kick-start clutch part for coupling engagement with the kick-start clutch part 240. In order to start the internal combustion engine of the motorcycle, the torque generated with the mechanical kick-start device 200 can be transmitted to the kick-start pinion 220 via the kick-start gear wheel 220 by causing the kick-start pinion to engage the end-face toothing of the kick-start gear wheel 220 along the main transmission shaft 340. In addition, the transverse toothing of the kick-start pinion and the transverse toothing 241 of the kick-start clutch part 240 come into mutual engagement. The complementary transverse toothing is designed in such a way that a torque or a rotational movement can be transmitted from the kick-start pinion to the kick-start clutch part 240 in the starting and drive rotational direction x of the main transmission shaft 340, whereas, due to the inclined tooth surfaces, a freewheel is implemented inversely from the kick-start clutch part 240 to the kick-start pinion. In this way, the kick-start pedal can be prevented from rotating as well in the starting and drive direction x after the starting process has taken place. However, the transverse toothing 241 also enables the kick-start pedal to be returned to its starting position in the opposite reverse direction y after the starting process. During normal operation of the motorcycle, i.e. when the internal combustion engine is running, the kick-start pinion is neither in engagement with the kick-start clutch part 240 nor with the kick-start gear wheel 120 and is offset axially to the "rear" along the main transmission shaft 340.

In summary, to start the internal combustion engine, both the electric starter system 100 and the mechanical kick-start device 200 can act on the kick-start clutch part 240, with the torque of the electric starter motor 110 being transmittable at the end face and the torque of the mechanical kick-start device 200 being axially transmittable to the kick-start clutch part 240. The torque transmission in this case is respectively provided with a freewheel in the form of the starter freewheel device 140 or the ratchet connection between the transverse toothing 241 of the kick-start clutch part 240 and the transverse toothing of the kick-start pinion. In this way, the electric starter system 100 can be integrated into the mechanical kick-start device 200 in a particularly space-saving manner and with only minimal modifications, with the functionality of the kick-start device 200 being completely retained.

Finally, FIG. 6 shows a schematic, perspective exploded view of an exemplary embodiment of an electric starter kit 100*a* according to the invention with the cover 250 of the kick-start device 200 mounted. The electric starter kit 100*a* comprises the electric starter motor 110, a first starter connector 131 and a second starter connector 132, an adapter plate 150, starter gearing 120, and a kick-start clutch part 240 with a starter freewheel device 140, which is provided with a starter ring gear 123 at the end face. Together with the fastening section 153 of the adapter plate 150, the first starter connector 131 and the second starter connector 132 form the starter gearing housing 130, within which the starter gearing 120 is mounted. The starter gearing 120 has the starter pinion 121 and the starter gear wheel 122, the latter engaging the starter ring gear 123 at the end face. The starter pinion 121 is designed as a double gear wheel and engages a pinion 124, which is part of a further double gear wheel, at the opposite end of the shaft. The gear wheel 125 arranged on the same shaft finally engages the starter shaft pinion 112 of the electric starter motor 110. By means of the starter gearing 120, the torque that can be tapped at the starter shaft pinion 112 is passed on to the kick-start clutch part 240 by means of its starter ring gear 123 over several gear ratios and levels, preferably four gear ratios and three levels.

The electric starter motor 110, the starter gearing housing 130 with the starter gearing 120 contained therein, and the kick-start clutch part 240 with the starter freewheel device 140 are preferably already pre-assembled together with the adapter plate 150, so that only the cover 250 has to be removed to retrofit a motorcycle with a mechanical kick-start device 200, and the adapter plate 150 is to be attached to the corresponding pre-assembled components of the electric starter kit 100*a*, between the cover 250 and the transmission housing 310. For fastening, the electric starter kit 100*a* can optionally be provided with extended fastening means 251*a* in order to compensate for the increased distance between the cover 250 and the transmission housing 310 due to the adapter plate 150. Also optionally, the electric starter kit 110*a* can additionally have an extended kick-start shaft 210 and/or an extended brake shaft and/or an extended transmission clutch actuation lever 350 and/or an extended clutch push rod 360, each for replacement as needed and/or optionally with the corresponding original components of the motorcycle.

Overall, the electric starter kit 100*a* can be retrofitted in a simple and uncomplicated manner without the need for special technical knowledge or special tools. The modifications to be made to the original components are minimal and visually almost imperceptible; the function of the mechanical kick-start device 200 is fully retained. Preferably, only the original kick-start clutch part is to be replaced by the kick-start clutch part 240 having the starter freewheel device 140 and the starter ring gear 123. Depending on the design, it may also be necessary to replace the kick-start shaft 210 and/or the brake shaft and/or the transmission clutch actuation lever 350 and/or the clutch push rod 360.

LIST OF REFERENCE NUMERALS

100 Electric starter system
100*a* Electric starter kit
110 Electric starter motor
112 Starter shaft pinion
120 Starter gearing
121 Starter pinion
122 Starter gear wheel
123 Starter ring gear
124 Pinion
125 Gear wheel
130 Starter gearing housing
131 First starter connector
132 Second starter connector
140 Starter freewheel device
141 Radially outer raceway
142 Radially inner raceway
143 Rolling element
150 Adapter plate 151 Recess
152 Mounting area
153 Fastening section
154 Screws
200 Mechanical kick-start device
210 Kick-start shaft
211 Pedal connector
212 Spring seat
220 Kick-start gear wheel
221 Stop pin
240 Kick-start clutch part
241 Transverse toothing
250 Cover
251 Fastening means
251a Extended fastening means
300 Transmission
310 Transmission housing
320 Adapter section
330 Transmission base plate
340 Main transmission shaft
350 Transmission clutch actuation lever
360 Clutch push rod
x Starting and drive direction of rotation
y Reverse direction

The invention claimed is:

1. An electric starter system (100) for a motorcycle with a mechanical kick-start device (200), wherein the motorcycle has a transmission main shaft (340) which rotates in a starting and drive rotational direction (x) in order to start the motorcycle and during the normal operation of the cycle, and the kick-start device (200) has a kick-start pinion and a kick-start clutch part (240), wherein the kick-start pinion is configured for axial coupling to the kick-start clutch part (240), and the kick-start clutch part (240) is connected to the transmission main shaft (340) in a torque-transmitting manner, and wherein the electric starter system (100) comprises an electric starter motor (110) with a starter shaft pinion (112) that can be driven thereby, characterized in that the electric starter system (100) is configured to transmit a torque of the electric starter motor (110) from the starter shaft pinion (112) to the kick-start clutch part (240), wherein the electric starter system (100) has an adapter plate (150) which is configured to connect the electric starter motor (110) to a transmission housing (310) of the motorcycle or to mount the kick-start clutch part (240) with a starter freewheel device (140).

2. The electric starter system (100) according to claim 1, characterized in that the electric starter motor (110) is arranged axially parallel to the main transmission shaft (340) and is configured to transmit its torque to the kick-start clutch part (240), which is connected to the main transmission shaft (340) in a torque-transmitting manner, via one or more stages of interposed starter gearing (120) of the electric starter system (100).

3. The electric starter system (100) according to claim 2, characterized in that the electric starter system (100) has a starter ring gear (123) that surrounds the kick-start clutch part (240) coaxially for torque-transmitting engagement with a starter gear wheel (122) of the starter gearing (120), or with the starter shaft pinion (112) of the electric starter motor (100).

4. The electric starter system (100) according to claim 1, characterized in that the electric starter system (100) has a starter freewheel device (140), which is interposed between the electric starter motor (110) and the kick-start clutch part (240), so that a torque-transmitting coupling is formed from the electric starter motor (110) to the kick-start clutch part (240) in the starting and drive direction of rotation (x) of the main transmission shaft (340), and a free-running coupling is formed from the kick-start clutch part (240) to the electric starter motor (110).

5. The electric starter system (100) according to claim 4, characterized in that the starter freewheel device (140) is configured in the manner of a sprag or pinch roller freewheel and surrounds the kick-start clutch part (240) coaxially, wherein a rotational movement of the main transmission shaft (340) is blocked.

6. The electric starter system (100) according to claim 5, characterized in that the starter freewheel device (140) is configured as a sprag or roller freewheel and has a radially outer raceway (141) and a radially inner raceway (142), wherein the radially outer raceway (141) is connected, in a torque-transmitting manner, to the starter ring gear (123) of the electric starter system (100) and the radially inner raceway (142) is connected, in a torque-transmitting manner, to the kick-start clutch part (240) of the kick-start device (200).

7. The electric starter system (100) according to claim 1, characterized in that the electric starter system (100) has an adapter plate (150) which is arranged between a cover (250) of the kick-start device (200) and a transmission housing (310) of the motorcycle, and the electric starter motor (110) is attached to the transmission housing (310) of the motorcycle by means of the adapter plate (150).

8. The electric starter system (100) according to claim 7, characterized in that the adapter plate (150) has or forms a mounting area (152) for mounting the starter freewheel device (140) or for mounting a starter ring gear (123).

9. The electric starter system (100) according to claim 1, characterized in that the electric starter system (100) has a kick-start shaft (210) with a removable spring seat (212) for mounting a kick-start spring, wherein the kick-start shaft (210) is designed for torque-transmitting connection to a kick-start gear wheel (220).

10. An electric starter kit (100a) for retrofitting a motorcycle with a mechanical kick-start device (200), wherein the motorcycle has a main transmission shaft (340) which rotates in a starting and drive direction of rotation (x) for starting the motorcycle and during normal operation of the motorcycle, the electric starter kit (100a) comprising, an electric starter motor (110) with a starter shaft pinion (112) that can be driven thereby;

a kick-start clutch part (240) with a starter freewheel device (140), wherein the kick-start clutch part (240) is configured for torque-transmitting connection to the main transmission shaft (340), and the starter freewheel device (140) is configured for coupling the kick-start clutch part (240) to the starter shaft pinion (112); and an adapter plate (150) which is configured to connect the electric starter motor (110) to a transmission housing (310) of the motorcycle or to mount the kick-start clutch part (240) with a starter freewheel device (140).

11. The electric starter kit (100*a*) according to claim 10, characterized in that
the electric starter kit (100*a*) is preassembled, wherein the adapter plate (150) is connected to the electric starter motor (110) or the kick-start clutch part (240) with the starter freewheel device (140) being arranged within a mounting area (152) of the adapter plate (150) configured for this purpose.

12. The electric starter kit (100*a*) according to claim 11, characterized in that
the electric starter kit (100*a*) comprises a starter gear wheel (122) and a starter ring gear (123), wherein the starter ring gear (123) is arranged coaxially surrounding the kick-start clutch part (240) and the starter freewheel device (140), and the starter gear wheel (122) is configured or is arranged as part of starter gearing (120) for coupling to the starter shaft pinion (112) of the electric starter motor (110) and for engaging the starter ring gear (123).

13. The electric starter kit (100*a*) according to claim 12, characterized in that
the electric starter kit (110*a*) comprises a kick-start shaft (210) with a removable spring seat (212), wherein the kick-start shaft (210) is configured for torque-transmitting connection to a kick-start gear wheel (220) of the kick-start device (200).

14. The electric starter kit (100*a*) according to claim 10, characterized in that
the electric starter kit (100*a*) has a kick-start shaft (210) or a brake shaft or a transmission clutch actuation lever (350) or a clutch push rod (360) for replacement as needed or with the corresponding original components of the motorcycle.

15. A motorcycle equipped, retrofitted, or provided with an electric starter system (100) according to claim 1.

* * * * *